M. BARROW.
EGG CARRIER.
APPLICATION FILED MAR. 9, 1914.
1,139,628.
Patented May 18, 1915.
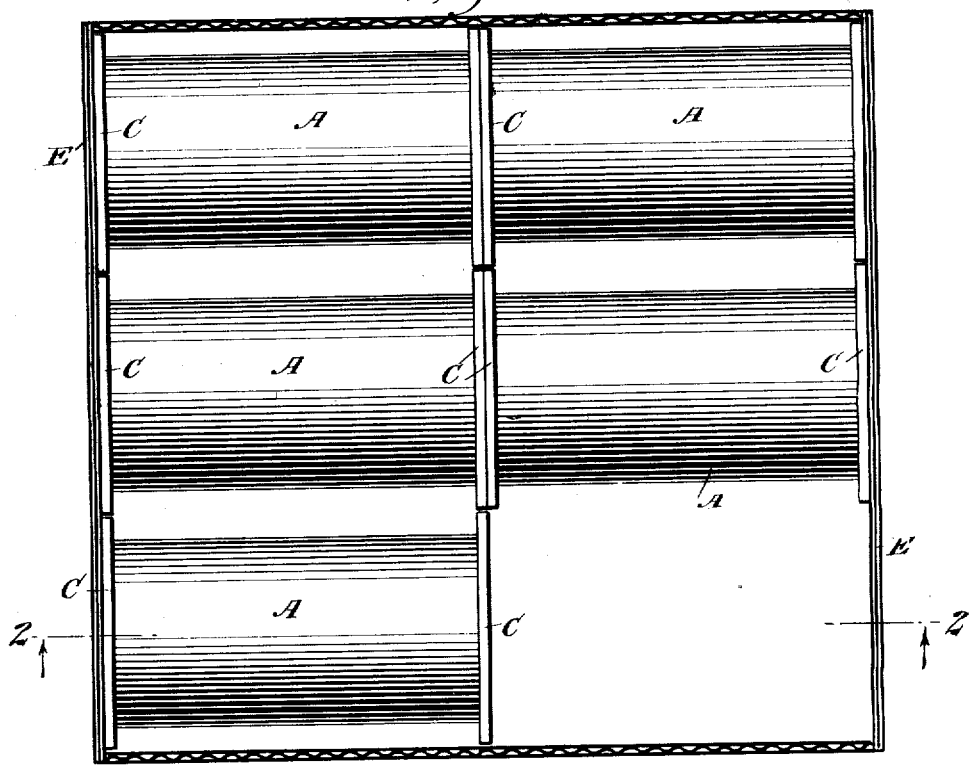
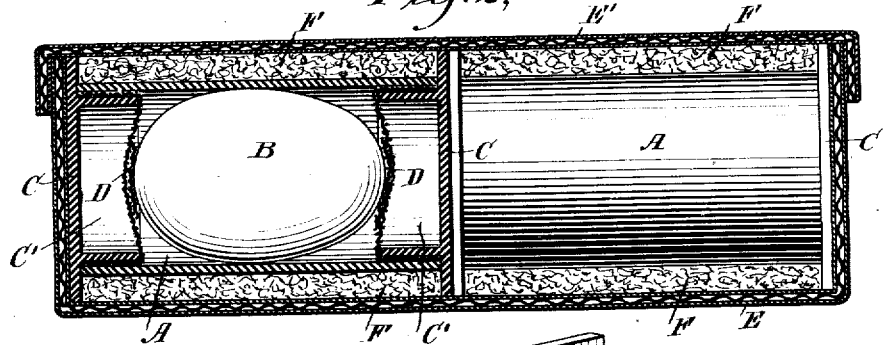
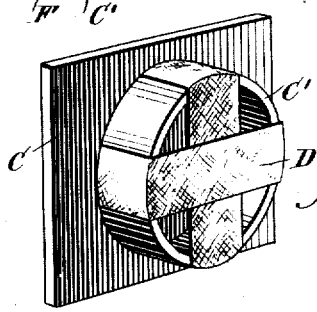
WITNESSES
Edw. Thorpe
Theo. J. Hoshts
INVENTOR
Morris Barrow
BY Munn & Co
ATTORNEYS

UNITED STATES PATENT OFFICE.

MORRIS BARROW, OF NEW YORK, N. Y.

EGG-CARRIER.

1,139,628. Specification of Letters Patent. Patented May 18, 1915.

Application filed March 9, 1914. Serial No. 823,389.

*To all whom it may concern:*

Be it known that I, MORRIS BARROW, a subject of the Czar of Russia, and a resident of the city of New York, borough of Manhattan, in the county and State of New York, have invented a new and Improved Egg-Carrier, of which the following is a full, clear, and exact description.

The object of the invention is to provide a new and improved egg carrier arranged to permit the safe shipping of eggs by parcel post, express companies or other means of transportation.

In order to accomplish the desired result use is made of a tubular shell adapted to contain a single egg, and heads closing the ends of the shell and adapted to rest on a supporting surface, the heads extending beyond the outer face of the shell to support the latter out of contact with the supporting surface, the heads having at their inner ends cushions adapted to engage the ends of the egg contained in the shell.

A practical embodiment of the invention is represented in the accompanying drawings forming a part of this specification, in which similar characters of reference indicate corresponding parts in all the views.

Figure 1 is a plan view of a shipping box containing a number of egg carriers, the cover of the box being removed; Fig. 2 is a sectional side elevation of the same with the cover in position, the section being on the line 2—2 of Fig. 1; and Fig. 3 is a perspective view of one of the heads of the egg carrier.

The egg carrier is in the form of a tubular shell A adapted to contain a single egg B, and the open ends of the shell A are closed by heads C, each made square with the edges extending a distance beyond the outer surface of the shell A. Each head C is provided on its inner face with a hub C' extending into the tubular shell A, and on the inner face of the hub C' is arranged a cushion D, preferably made of strips of a fabric material such as cotton cloth or the like, the strips crossing each other and being glued or otherwise fastened to the peripheral face of the hub C'. By the arrangement described the heads C are adapted to rest on a supporting surface such, for instance, as the bottom of a box E, and the heads support the shell A out of contact with the said supporting surface.

By reference to Fig. 2, it will be noticed that the ends of the egg B contained in the shell A rest on the middle portion of the cushions D so that the egg can slightly move about in a longitudinal direction within the shell A in case of an accidental concussion of the box E, thus preventing the egg from being broken while in transit. The box E is so arranged that it contains, say, half a dozen or a dozen carriers, the carriers snugly fitting into the box, one against the other at the heads C, to prevent movement of the carriers in the box E during transit. If desired, a loose packing material F may be packed around the shell A, as indicated in Fig. 2. The box E is closed by a suitable cover E', and in practice the box and its cover are preferably made of corrugated cardboard, as indicated in Figs. 1 and 2.

The egg carrier shown and described, is very simple in construction and it can be readily opened by removing one of the heads for the insertion of an egg and then closed by replacing the head. It will also be noticed that the egg carrier can be reused many times, and as the shell A and the heads C are preferably made of cardboard, it is evident that the egg carrier can be cheaply manufactured.

Having thus described my invention, I claim as new and desire to secure by Letters Patent:

1. An egg carrier, comprising a tubular shell adapted to contain a single egg, and heads closing the ends of the said shell and extending beyond the outer face of the shell to rest on a supporting surface and to support the shell out of contact with the said supporting surface, the heads being provided at their inner ends with crossed fabric strips forming cushions adapted to engage the ends of the egg contained in the shell.

2. An egg carrier, comprising a tubular shell adapted to contain a single egg, and heads closing the ends of the said shell, the heads being larger than the shell and the edges thereof being a distance from the outer surface of the shell, the heads having hubs extending into the ends of the shell and cushions on the inner ends of the hubs and formed of strips of fabric material, the strips crossing each other and being secured to the hub.

3. An egg carrier comprising a tubular shell adapted to contain an egg, and enlarged heads closing the ends of said shell, the edges of the heads being a distance from the outer surface of the shell entirely therearound whereby to support the latter out of contact with the surrounding parts, the heads also having hollow hubs closely fitting within the ends of the shell, and fabric strips extending across the entire ends of said hubs and forming cushions across the whole interior of the shell.

In testimony whereof I have signed my name to this specification in the presence of two subscribing witnesses.

MORRIS BARROW.

Witnesses:
EMANUEL BEHAL,
LOUIS ARGULA.

Correction in Letters Patent No. 1,139,628.

It is hereby certified that in Letters Patent No. 1,139,628, granted May 18, 1915, upon the application of Morris Barrow, of New York, N. Y., for an improvement in "Egg-Carriers," an error appears in the printed specification requiring correction as follows: Page 1, line 3, for the words "subject of the Czar of Russia" read *citizen of the United States;* and that the said Letters Patent should be read with this correction therein that the same may conform to the record of the case in the Patent Office.

Signed and sealed this 15th day of June, A. D., 1915.

[SEAL.]

J. T. NEWTON,
*Acting Commissioner of Patents.*